United States Patent
Kerr et al.

(10) Patent No.: US 7,292,578 B1
(45) Date of Patent: Nov. 6, 2007

(54) FLEXIBLE, HIGH PERFORMANCE SUPPORT FOR QOS ON AN ARBITRARY NUMBER OF QUEUES

(75) Inventors: Darren Kerr, Palo Alto, CA (US); Van Jacobson, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 1192 days.

(21) Appl. No.: 09/884,336

(22) Filed: Jun. 19, 2001

(51) Int. Cl.
H04L 12/56 (2006.01)

(52) U.S. Cl. ............... 370/395.32; 370/235; 370/414; 370/468

(58) Field of Classification Search ............... 370/230, 370/230.1, 232–235, 395.32, 395.4–395.43, 370/395.5, 412, 414, 416, 418, 468; 709/238–244
See application file for complete search history.

(56) References Cited

U.S. PATENT DOCUMENTS

| | | | |
|---|---|---|---|
| 6,167,445 A | 12/2000 | Gai et al. | |
| 6,175,570 B1 | 1/2001 | Cukier et al. | |
| 6,188,698 B1 | 2/2001 | Galand et al. | |
| 6,272,151 B1 | 8/2001 | Grupta et al. | |
| 6,356,548 B1 | 3/2002 | Nellenbach et al. | |
| 6,408,005 B1 * | 6/2002 | Fan et al. | 370/412 |
| 6,424,624 B1 | 7/2002 | Galand et al. | |
| 6,430,191 B1 | 8/2002 | Klausmeier et al. | |
| 6,434,624 B1 | 8/2002 | Gai et al. | |
| 6,483,839 B1 * | 11/2002 | Gemar et al. | 370/395.42 |
| 6,512,743 B1 | 1/2003 | Fang | |
| 6,546,017 B1 * | 4/2003 | Khaunte | 370/412 |
| 6,657,960 B1 * | 12/2003 | Jeffries et al. | 370/230.1 |
| 6,687,781 B2 * | 2/2004 | Wynne et al. | 710/317 |
| 6,795,865 B1 * | 9/2004 | Bahl et al. | 709/235 |

FOREIGN PATENT DOCUMENTS

| | | | |
|---|---|---|---|
| EP | 820023 A1 * | 1/1998 | |
| WO | WO 8704030 A1 * | 7/1987 | |

OTHER PUBLICATIONS

Francini, A. et al., "A Weighted Fair Queueing Scheduler with Decoupled Bandwidth and Delay Guarantees for the Support of Voice Traffic," Global Telecommunications Conference, 2001. GLOBECOM '01. IEEE vol. 3, Nov. 25-29, 2001. pp. 1821-1827.*
Bechler, M. et al., "Traffic Shaping in End Systems Attached to QoS-Supporting Networks," Proceedings of Sixth IEEE Symposium on Computers and Communications, 2001. Jul. 3-5, 2001. pp. 296-301.*
Varghese et al., "Hashed and Hierarchical Timing Wheels: Efficient Data Structures for Implementing a Timer Facility," IEEE/ACM Transactions on Networking, vol. 5, No. 6, Dec. 1997. pp. 824-834.*

* cited by examiner

*Primary Examiner*—Wellington Chin
*Assistant Examiner*—Donald L Mills
(74) *Attorney, Agent, or Firm*—Cesari and McKenna LLP

(57) ABSTRACT

A VTMS queue scheduler integrates traffic shaping and link sharing functions within a single mechanism and that scales to an arbitrary number of queues of an intermediate station in a computer network. The scheduler assigns committed information bit rate and excess information bit rate values per queue, along with a shaped maximum bit rate per media link of the station. The integration of shaping and sharing functions decreases latency-induced inaccuracies by eliminating a queue and feedback mechanism between the sharing and shaping functions of conventional systems.

17 Claims, 7 Drawing Sheets

FLEXIBLE, HIGH PERFORMANCE SUPPORT FOR QOS ON AN ARBITRARY NUMBER OF QUEUES

FIELD OF THE INVENTION

The present invention relates to computer networks and, in particular, to queue scheduling functions of an intermediate node of a computer network.

BACKGROUND OF THE INVENTION

A computer network is a geographically distributed collection of interconnected network links and segments for transporting data between nodes, such as computers. Many types of network segments are available, with the types ranging from local area networks (LANs) to wide area networks (WANs). End nodes, such as personal computers or workstations, typically communicate over the network by exchanging discrete frames or packets of data according to predefined protocols. In this context, a protocol consists of a set of rules defining how the nodes interact with each other.

Computer networks may be further interconnected by an intermediate node, such as a switch or router, having a plurality of ports which may be coupled to the networks. For example, a switch may be utilized to provide a "switching" function for transferring information between a plurality of LANs at high speed. The switching function includes receiving a data packet at a source port that originated from a source node and transferring that packet to at least one destination port for forwarding to a destination node.

On the other hand, a router may be used to interconnect LANs executing different LAN standards and/or to provide higher level functionality than a switch. If the LAN standards associated with the source and destination nodes are dissimilar (e.g., Ethernet and token ring), the router may also alter the format of the packet so that it may be received by the destination node. Routers typically operate at the network layer of a communications protocol stack used by the network, such as the internetwork layer of the Transmission Control Protocol/Internet Protocol (TCP/IP) communications architecture.

To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISPs equipment. Here, a router may be utilized to interconnect a plurality of private networks to an IP backbone network.

Typically, high-speed input links of the private networks couple to input ports of the router that feed to a single output buffer connected to an output link of the IP backbone network. Depending upon the bandwidths of the input and output links, the incoming data packets may "burst-up" at the output buffer as the packets wait to be transmitted over the shared output link. Moreover, the router may function to aggregate different kinds of packet traffic (e.g., large data packets v. small voice or video packets) over the shared link; in this case, different qualities of service (QoS) may also be required for those packets.

For example, if a small voice packet is loaded into the output buffer behind a large data packet, the voice packet will incur a latency of at least the time needed for the data packet to exit the buffer over the output link. A common objective is to reduce the total end-to-end round trip time for voice packets traversing a network between two end nodes in situations where, e.g., users are conducting a telephone conversation. Some unavoidable delay is incurred when packets traverse the actual network links between the nodes; however, it is possible to reduce packet delay that arises within the routers of the network. One source of delay within a router is the delay incurred at the output buffer (e.g., a queue); an objective of the present invention is to reduce the delay encountered by a packet within a queue structure of an intermediate station, such as a switch or router.

A solution to the QoS issue is to provide a plurality of output queues at the router, where each queue is dedicated to a particular data type. For example, a relatively large queue may be provided for data traffic so that the "data" queue can accommodate bursts of data as provided by, e.g., file transfer protocol transfers. In contrast, relatively small output queues may be allocated for voice and video traffic forwarded through the router. Yet, each of these output queues require access to a single resource, e.g., the output link. Accordingly, a scheduler function may be employed within the router to service the queues in an ordered manner according to the types of traffic and the QoS policies governing the relationships between these types of traffic.

One type of scheduler utilized in packet-based switches and/or routers is a link sharing queue scheduler that multiplexes the packets stored in a number of output queues onto a shared media link in a configurable manner that provides fairness and weighted relative priority. Examples of link sharing algorithms executed by the scheduler include weighted fair queuing (WFQ), weighted round robin (WRR), deficit round robin (DRR) and modified deficit round robin (MDRR). The WFQ algorithm is characterized by the assignment of relative weights to the each of the output queues that share the bandwidth of a single output link. When these output queues are not empty, they are serviced such that the total bandwidth of the output link is apportioned among the relative weighted ratios of the queues. WRR is an algorithm that implements weighted queuing in a fair, round robin manner.

The DRR algorithm assigns each queue a quantum of work and enforces bandwidth rates such that each output queue delivers its proportion of a maximum transfer unit with respect to the total bandwidth of the output link. The DRR algorithm further ensures that each of the output queues is serviced fairly with respect to each other. A problem with this algorithm is that if one of the queues is configured to store voice packets whose actual bandwidth is small relative to the total bandwidth of the output link, substantial delays may be incurred by those packets when fairly servicing the voice queue with respect to the other output queues.

The MDRR algorithm operates to provide priority service to such a "delay-sensitive" queue while maintaining typical DRR service for the remaining queues. One implementation of the MDRR algorithm is a strict priority implementation that always services a low latency queue before servicing the remaining queues. Disadvantages of this implementation include (i) the potential to "starve out" the remaining queues and (ii) a limitation of one low latency output queue, i.e., the MDRR algorithm does not allow the flexibility to define more than one low latency queue for a strict priority implementation.

A further implementation of weighted link sharing involves utilization of the entire bandwidth of the output link in the presence of any non-empty output queues. Specifically, if one queue in a weighted link-sharing environment is not being used, the bandwidths of the remaining queues increase but at a rate that is proportional to their relative weights. This implementation of weighted link sharing is referred to as a work conserving implementation. Another class of schedulers, known as non-work conserving schedulers, may not transmit a packet even if one is waiting to be serviced. Although work conserving schedulers produce lower delays and lower packet loss ratios, non-work conserving schedulers have the capability to perform traffic shaping. Traffic shaping schedulers smooth the transmission of packets from an output queue at a configured bit rate in a generally non-work conserving manner.

Some conventional packet-based switches and routers include traffic shaping and link sharing functions, wherein the traffic shaping function enforces a configurable maximum bit rate on a link or queue to complement the weighted minimal share guaranteed by the link sharing function. These routers generally implement traffic shaping as a function independent of link sharing, either in software, e.g., as separate functional blocks downstream from one another, or in hardware, e.g., as separate functional mechanisms associated with levels of a queuing subsystem cascaded as a hierarchy of queues, typically within an application specific integrated circuit (ASIC). The queuing subsystem may comprise a multi-level structure that includes a top level of queues associated with a link sharing mechanism coupled to an intermediate level of queues associated with a traffic shaping mechanism. However, the hardware implementation of separate functional mechanisms associated with the queuing subsystem consumes substantial "real estate" on the ASIC and typically employs a feedback mechanism from the intermediate level to the top level of queues to, e.g., enforce bandwith consumption requirements. The software implementation of separate functional blocks, on the other hand, is generally complicated and consumes substantial processor resources on the routers.

Multi-level queuing structures are also often present in switches and routers that implement class-based queuing (CBQ). CBQ techniques require a plurality of queuing functions (e.g., enqueue and dequeue operations) at each level of the cascading hierarchy of queues, resulting in higher implementation costs for a given performance level. Because of the latency associated with these functions, forwarding performance of the router degrades rapidly as the number of queues is increased. This tends to limit the router to a small number of queues per interface, which, in turn, limits the services available through each interface.

Accordingly, it is desirable to provide a technique that supports common queuing and queue service disciplines within a framework that is sufficiently simple and compact for implementation in a hardware (ASIC) forwarding engine.

SUMMARY OF THE INVENTION

The invention comprises a VTMS queue scheduler that integrates traffic shaping and link sharing functions within a single mechanism and that scales to an arbitrary number of queues of an intermediate station in a computer network. The queues are preferably organized into a plurality of peer queue sets, wherein each queue set feeds into a sublink multiplexer (mux) circuit having an output provided to a media link queue coupled to an output media link. The novel scheduler assigns committed information bit rate (CIR) and excess information bit rate (EIR) values per queue, along with a shaped maximum bit rate per media link. The integration of shaping and sharing functions decreases latency-induced inaccuracies by eliminating a queue (buffer) and feedback mechanism between the sharing and shaping functions.

In the illustrative embodiment, the VTMS queue scheduler comprises a plurality of interconnected functional components, including a virtual time policer (VTP), an excess information rate (EIR) scaler and a novel timing wheel. The VTP determines whether media links are compliant and calculates when a queue is next eligible for servicing. The EIR scaler uniformly scales down EIR bandwidths of all queues sharing a link, so that the sum of all scaled active EIR bandwidths equals the available bandwidth of the shaped link. The timing wheel stores future event notifications that are triggered when a queue is eligible to be serviced according to one of several shaping parameters.

Since there are many different queues with varying "trigger" granularities, an efficient timing mechanism is needed to (i) determine which queue is currently eligible for service at a given point in time and (ii) trigger future events. The novel timing wheel comprises multiple fields per time slot where the fields represent different service priorities of queues. Unlike a conventional timing wheel that configures pointers to packets in the time slots, the novel timing wheel configures pointers to the queues storing the packets to enable "early" forwarding of the packets without incurring the overhead needed to search the wheel for other references to the packets. The queue(s) in a time slot are chained together and arranged such that there is no penalty (extra work) for collisions during queuing/dequeuing operations. Scheduling decisions are made such that constant space (i.e., the number of priority levels times the number of queues) is required for linkage, independent of the number of collisions. The level of the output queue is provided to the scheduling decisions to accommodate time varying output bandwidth without violating the service policy.

According to the invention, the scheduler implements a novel VTMS scheduling process/algorithm that provides class-based queuing (CBQ) behavior at a single "flattened" level of hierarchy. To that end, the VTMS algorithm calculates actual rates assigned to the queues and services them according to their assigned rates. Specifically, the algorithm analyzes the total available bandwidth within a time quantum of one packet so that it can "shape" each queue as desired. The net rates of all queues are equal to the shaped bandwidth at the output link. In essence, the VTMS algorithm eliminates the queuing function associated with intermediate level queues of conventional CBQ systems, while retaining the semantics configured for that level of queues.

Advantageously, the VTMS scheduler supports common queuing and queue service disciplines within a single framework that is sufficiently simple and compact for implementation in a hardware (ASIC) forwarding engine. The performance of the scheduler is independent of the number of queues and, thus, supports an arbitrary number of different queues and services, limited only by memory available in the intermediate station.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
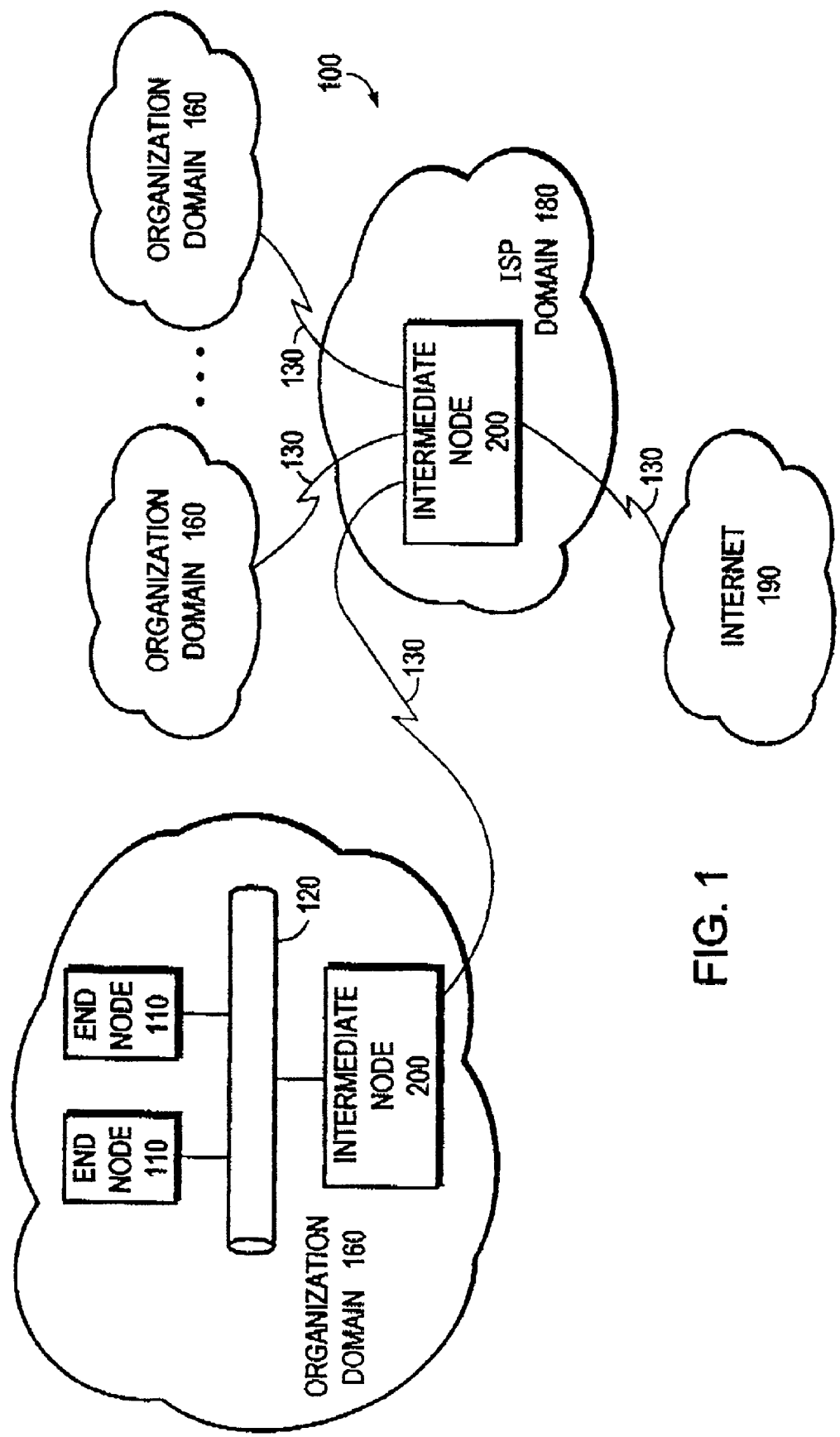
FIG. 1 is a block diagram of a network including a collection of network links and segments connected to a plurality of end and intermediate nodes.

FIG. 1 is a schematic block diagram of a computer network 100 comprising a collection of network links and segments connected to a plurality of nodes, such as end nodes 110 and intermediate nodes 200. Each node generally comprises a central processing unit (CPU), a memory unit and an input/output (I/O) unit interconnected by a system bus. The memory unit may comprise storage locations typically composed of random access memory devices, which are addressable by the CPU and the I/O unit. An operating system, portions of which are typically resident in memory and executed by the CPU, functionally organizes the node by, inter alia, invoking network operations and supportive application programs executing on the CPU. It will be apparent to those skilled in the art that other processor and memory means, including various computer readable media, may be used for storing and executing program instructions pertaining to the inventive process described herein.

The network links and segments may comprise local area networks (LANs) 120 and wide area network (WAN) links 130 interconnected by intermediate nodes 200, such as network switches or routers, to form an internetwork of computer nodes. These inter-networked nodes communicate by exchanging data packets according to a predefined set of protocols, such as the Transmission Control Protocol/Internet Protocol (TCP/IP). It should be noted that other techniques/protocols, such as the Hypertext Transfer Protocol (HTTP), may be advantageously used with the present invention.

To interconnect its dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 180. ISPs typically own one or more backbone networks that are configured to provide high-speed connection to the Internet, represented herein as Internet cloud 190. An organization may subscribe to one or more ISPs 180 and couple each of its private networks to the ISP's equipment.

Some ISPs also offer web-hosting services that provide one or more web servers having Internet connectivity to an organization wishing to establish a presence on the Internet. The organization and ISP typically enter into a service level agreement (SLA) that includes one or more traffic specifiers guaranteeing a level of service from the ISP 180 and/or placing limits on the amount of resources that the subscribing organization will consume for a given charge. For example, an organization may agree that the traffic from its web site will not exceed a certain bandwidth (e.g., 1-megabyte per second). The ISP monitors the traffic from the organization's web site to ensure that it complies with the relevant traffic specifiers and is thus "in-profile". Traffic that exceeds the specifier (i.e., traffic that is "out-of-profile") may be policed (i.e., dropped) or shaped (i.e., held until the traffic returns to its specified rate). Alternatively, the out-of-profile traffic may be subject to an accounting change (i.e., charged a higher rate) or marked, but nonetheless allowed to proceed by the ISP. If there is congestion, the ISP may drop such marked traffic first in an effort to relieve the congestion.

The policing and/or shaping of network traffic is typically performed in software by one or more intermediate devices 200 within the ISP's domain 180 executing, e.g., the Internetwork Operating System (IOS®) from Cisco Systems, Inc. of San Jose, Calif. The intermediate device identifies packets as belonging to a given traffic flow by examining a plurality of network and transport layer parameters (e.g., source and destination IP addresses, source and destination TCP/UDP port numbers and transport protocol). Based on this information, the software may identify a corresponding SLA and traffic specifier that applies to this flow. The software also processes the traffic to determine whether it is in or out of profile. If the traffic is in-profile, the software directs the intermediate device to forward the traffic. If the traffic is out-of-profile, the software directs the intermediate device to drop it, buffer it until it is in-profile or mark it, as provided by the applicable traffic specifier.

Figure 2:
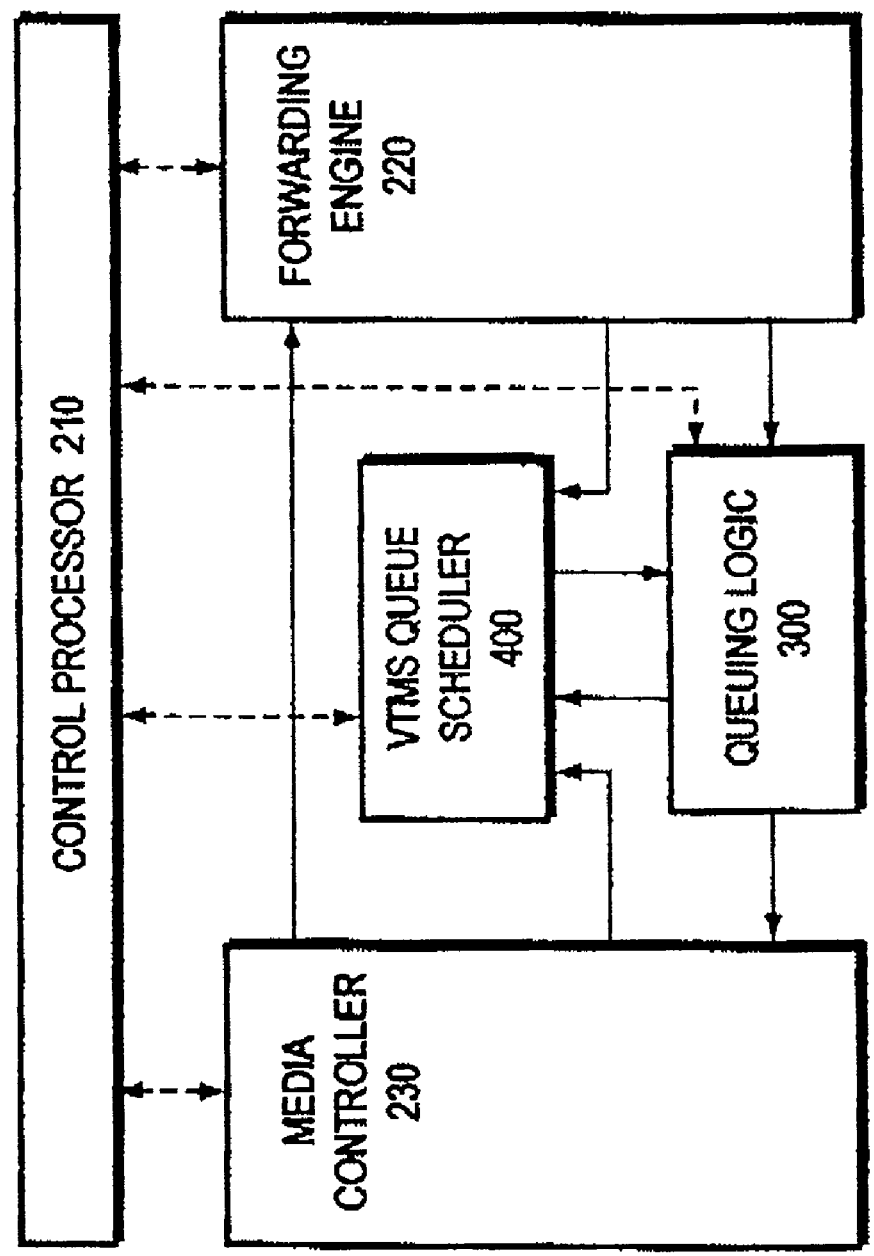
FIG. 2 is a functional block diagram of an intermediate node, including queuing logic and a novel queue scheduler in accordance with the invention.

FIG. 2 is a functional block diagram of intermediate node 200 which, in the illustrative embodiment, is preferably a router configured to perform layer 3 router processing operations. It should be noted, however, that the intermediate station may also be configured as a switch to perform layer 2 and/or higher layer processing functions. The router 200 comprises a plurality of interconnected components including a control processor 210, a forwarding engine 220, a media (link) controller 230, queuing logic 300 and a VTMS queue scheduler 400 for implementing a novel VTMS scheduling algorithm. The control processor 210 controls the operation of the router 200 and, to that end, performs configuration and management functions needed for the proper operation of the router.

The media controller 230 interfaces to a plurality of high speed interface ports, such as OC 12, OC 48, and OC 192 ports, contained on, e.g., line cards (not shown) of the router. The ports comprise conventional interface circuitry that incorporate, e.g., the signal and electrical circuitry needed to interface with physical media and protocols running over that media. The forwarding engine 220 processes incoming packets received from the media controller 230 and determines where to send the processed packets in accordance with IP forwarding operations. Execution of the forwarding operations results in, inter alia, destination media access control addresses of the (frames) packets being rewritten by the forwarding engine to identify output ports for those packets.

A typical configuration of the router may include many I/O channels associated with the port interfaces, each of which may be further associated with at least one buffer (queue) data structure. As a result, queuing logic 300 may comprise a plurality of queues and logic circuitry configured to organize queuing operations needed to maintain sequencing of packets, accommodate latency between various I/O data rates of the interfaces and provide quality of service (QoS) features. Preferably, the queues in queuing logic 300 are arranged to accommodate a plurality of customers, each of which may have requirements for various packet data types, such as voice, video and data traffic.

Figure 3:
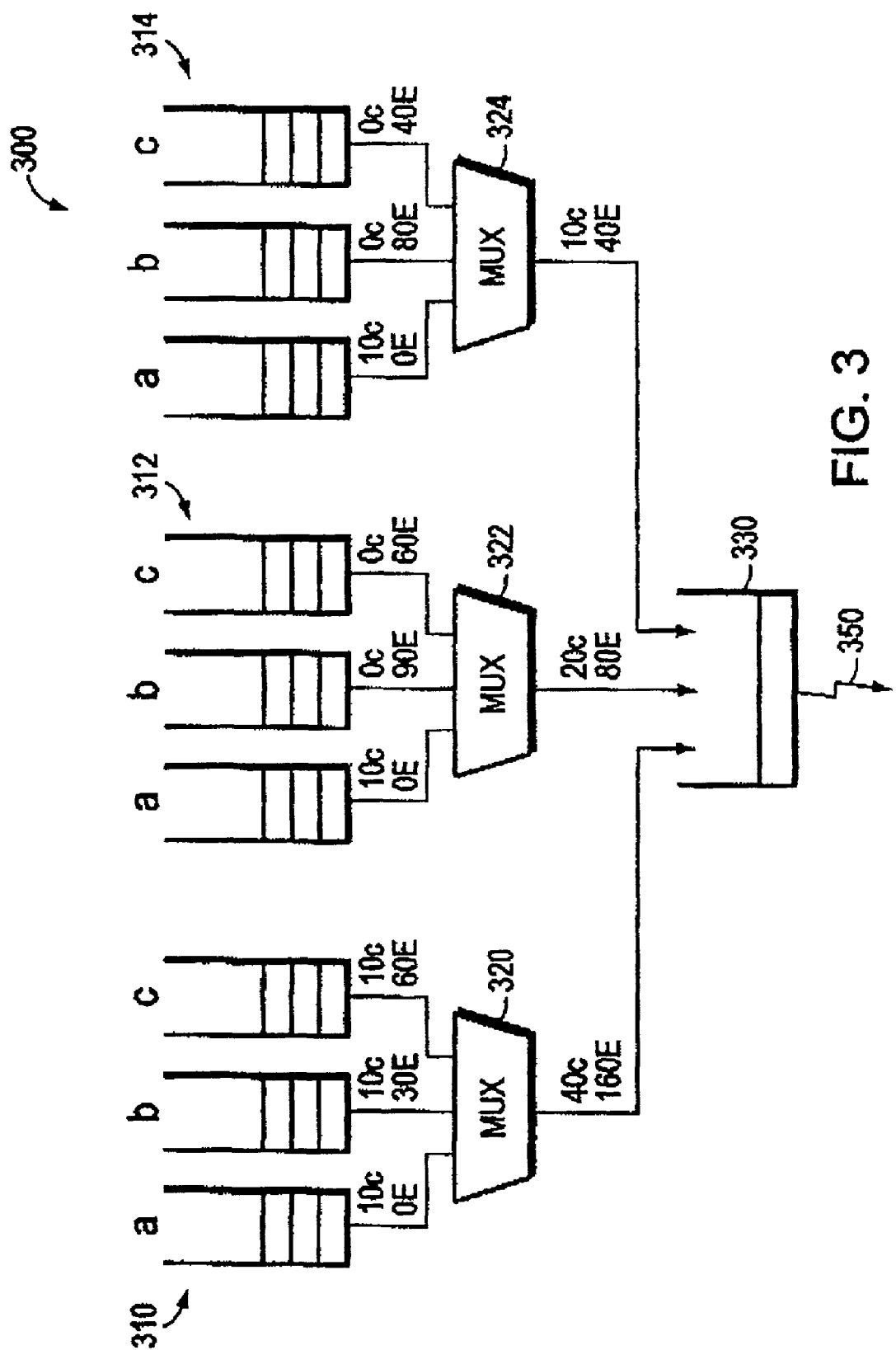
FIG. 3 is a schematic block diagram of an illustrative arrangement of the queuing logic of FIG. 2.

FIG. 3 is a schematic block diagram of an illustrative arrangement of queuing logic 300 that may be utilized by an ISP router 200 configured to service a plurality of organization domains. The queuing logic arrangement is organized into a plurality of peer queue sets 310-314, wherein each set includes a plurality of class queues a-c. Each class queue is preferably associated with a particular data type such as voice, routing and data traffic. Each set of peer queues feed into a sublink multiplexer (mux) circuit 320-324 having an output provided to a media link queue 330 (such as first-in first out, FIFO, structure) coupled to an output media link 350. It should be understood that the organization and configuration of queuing logic 300 is meant for illustrative purposes only, and that the present invention will operate with other, possibly far more complex, designs or topologies having additional queue sets coupled to additional media links.

According to an aspect of the invention, the traffic associated with each of the class queues may be shaped in addition to processed for link sharing. That is, the queue arrangement 300 is configured for both traffic shaping which disperses packets in time relative to the bandwidth rates assigned to the queues, and link sharing which involves always keeping the link FIFO 330 busy even though one or more queues are empty. To that end, the novel scheduler assigns committed information rate (CIR) and excess information rate (EIR) values per queue, along with a shaped maximum bit rate per media link. An ISP typically guarantees that respective traffic will be sent at the CIR transmission rate, and if excess bandwidth exists within the ISP's network, that traffic may be sent at the EIR transmission rate which is generally better (i.e., faster) than the associated CIR rate. If excess bandwidth does not exist, the traffic is simply sent at the guaranteed CIR rate.

In the illustrative embodiment, each input and output mux point is configured with CIR and EIR bit rates. For example, the input points to mux 320 from queues 310a-c may be configured with CIR and EIR rates: 10c, 10c and 10c, and 0e, 30e and 60e, respectively. In addition, the input points to mux 322 from queues 312a-c may be configured with CIR and EIR rates: 10c, 0c and 0c, and 0e, 90e and 60e, respectively; while the input points to mux 324 from queues 314a-c may be configured with CIR and EIR rates: 10c, 0c and 0c and 0e, 80e and 40e, respectively. Similarly, the output points from muxes 320, 322 and 324 may be configured with CIR and EIR rates: 40c, 160e; 20c, 80e; and 10c, 40e, respectively. The CIR rate assigned to each mux point functions as the traffic shaping aspect of the invention, whereas the EIR rate assigned to each point provides the link sharing aspect of the algorithm. The effect of the novel VTMS algorithm is that the committed rates assigned to the queues are guaranteed, whereas the excess rates are serviced among the queues based on the relative weighting assigned to those queues.

Figure 4:
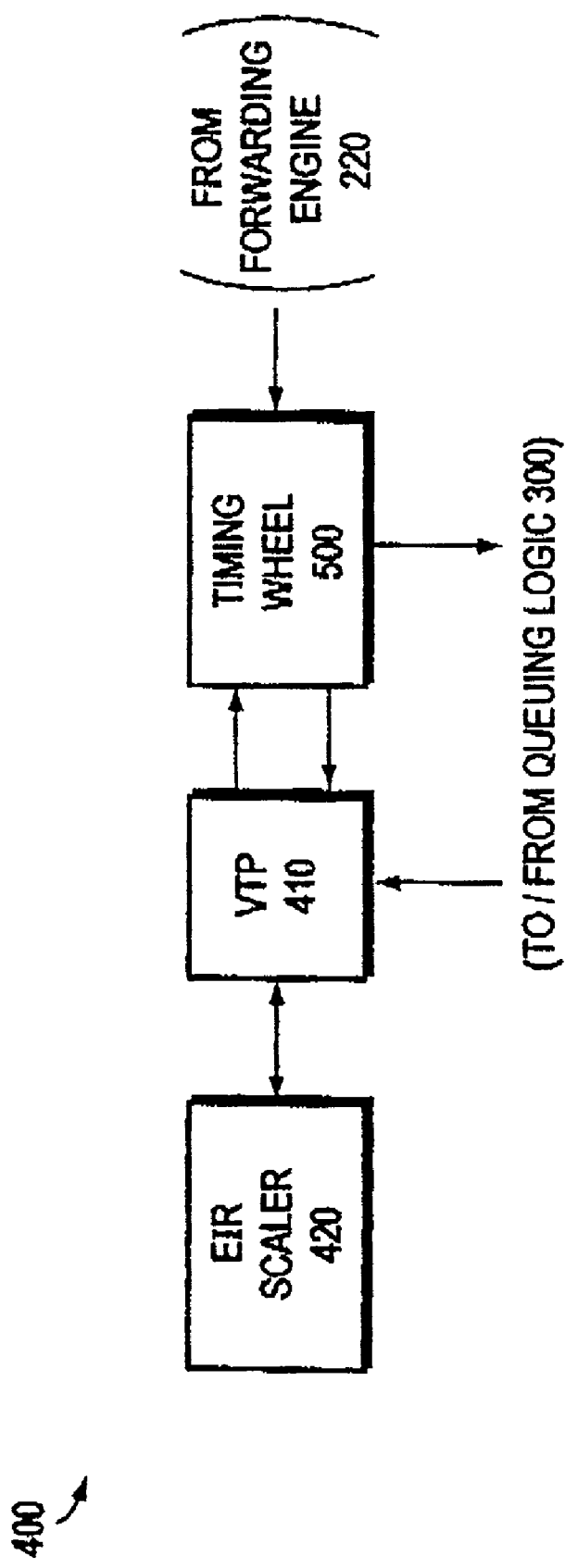
FIG. 4 is a highly schematic functional block diagram of the queue scheduler including a novel timing wheel in accordance with the invention.

In accordance with the invention, the VTMS queue scheduler integrates traffic shaping and link sharing functions within a single mechanism that scales to an arbitrary number of queues of an intermediate station, such as a router. The integration of shaping and sharing functions decreases latency-induced inaccuracies by eliminating a queue (buffer) and feedback mechanism that typically exists between the sharing and shaping functions. FIG. 4 is a highly schematic functional block diagram of the VTMS queue scheduler 400 comprising a virtual time policer (VTP) 410 coupled between an EIR scaler 420 and a timing wheel 500.

The VTP 410 is used to determine whether media links are compliant and for calculating when a queue is next eligible for servicing. The VTP requires a timestamp (preferably at least 20 bits of manticia), an inverse rate for calculating an offset from a packet length, an allowable burst time and access to a real time clock (not shown) indicating the current time with a granularity of at least a scheduler time slot (e.g., the time to send 10 minimum size packets at a peak forwarding rate). The VTMS scheduler 400 performs read and write operations of a queue timestamp and link timestamp every time a queue is serviced. In the illustrative embodiment, calculation of a new link timestamp requires a 16-bit multiply operation in addition to a shift and an add operation. The queue timestamp requires an additional multiply operation and shift operation of an EIR scale factor for every level in the virtual hierarchy.

The EIR scaler 420 is used to uniformly scale down EIR bandwidths of all queues sharing a link, so that the sum of all scaled active EIR bandwidths equals the available bandwidth of the shaped link (shaped bandwidth minus sum of all active CIR queues). The EIR scaler/policer requires a 10-bit scale factor for every level in the virtual hierarchy. The scale factor is adjusted (at most) once per scheduling interval either because a queue is non-empty and one of its rate components is unscheduled, or because a queue's rate component is serviced and the queue is found to be empty. The formula for calculating an inverse scale factor for a simple hierarchy (one level of class queues multiplexed to media links) is as follows:

$$inv\_scale\ (aggregate\_EIR\_bw/(link\_bw-aggregate\_CIR\_bw)$$

During recalculation of an EIR VTP timestamp, the "ticks" offset added to the current timestamp is calculated as follows, taking into consideration the EIR scale factor:

$$ticks=((inv\_rate*(inv\_scale*bytes))>>inv\_shift)$$

The first level (closest to media link) scale factor is calculated as above. For a two-level hierarchy, the second level scale factor for a given mux point is calculated as follows:

$$mux\_avail\_bw=mux\_CIR\_bw-aggregate\_CIR\_bw\_2$$

$$inv\_scale\_2=(agg\_EIR\_bw\_2/((mux\_avail\_bw*inv\_scale)+mux\_EIR-bw))$$

During calculation of the EIR VTP timestamp, the ticks offset is as follows:

$$ticks=((inv\_rate*(inv\_scale*inv\_scale\_2*bytes))>>inv\_shift)$$

The VTMS scheduler 400 employs a timing wheel 500 to store future event notifications that are triggered when a queue is eligible to be serviced according to one of several shaping parameters. Since there are many different queues with varying trigger granularities (ranging, e.g., from a few microseconds to hundreds of milliseconds), an efficient mechanism is needed to (i) determine which queue is currently eligible for service at a given point in time and (ii) trigger future events. The timing wheel 500 includes a plurality of time slots with sufficient granularity to provide low scheduling jitter, but also coarse enough to minimize polling overhead and memory usage. Moreover, the wheel 500 is large enough to schedule an event as far in the future as a single maximum transfer unit (MTU) packet at the slowest queue's rate in a worst case EIR scale factor.

Broadly stated, the novel timing wheel comprises multiple fields per time slot wherein the fields represent different service priorities of queues. Unlike a conventional timing wheel that configures pointers to packets in the time slots, the novel timing wheel configures pointers to the queues storing the packets to enable "early" forwarding of the packets without incurring the overhead needed to search the wheel for other references to the packets. The queue(s) in a time slot are chained together and arranged such that there is no penalty (extra work) for collisions during queuing/dequeuing operations. Scheduling decisions are made such that constant space (i.e., the number of priority levels times the number of queues) is required for linkage, independent of the number of collisions. The level of the output queue is provided to the scheduling decisions to accommodate time varying output bandwidth without violating the service policy.

Figure 5A:
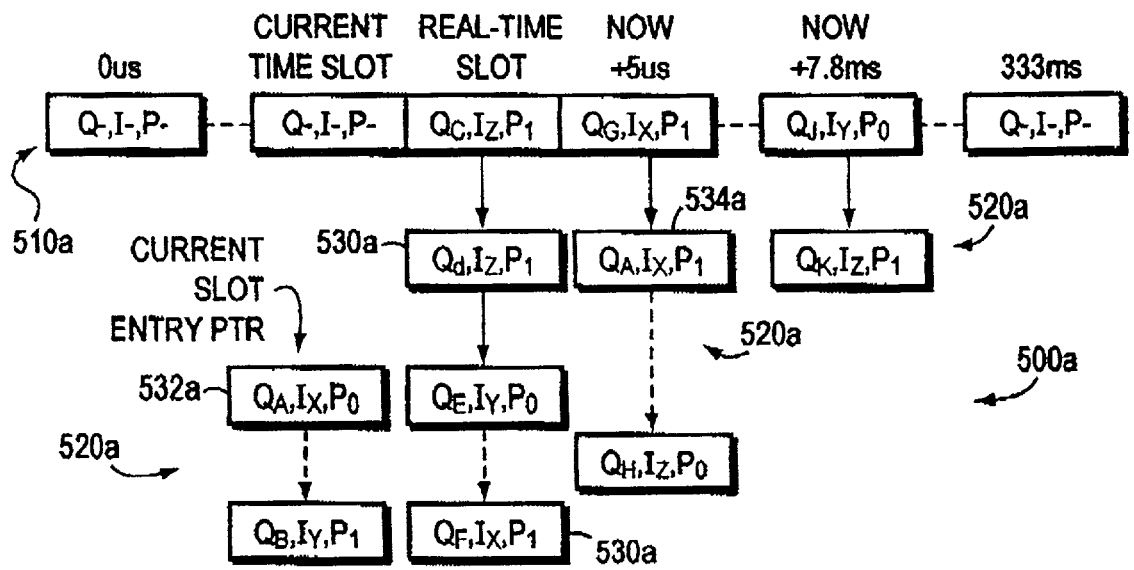
FIGS. 5A and 5B are highly schematic diagrams of embodiments of the timing wheel of FIG. 4.

FIG. 5A is a highly schematic diagram of a timing wheel 500a organized as a contiguous array 510a (e.g., a hash array) of time slots containing pointers to linked lists 520a (e.g., hash lists). The wheel is preferably an array of 64,000, 4-byte slot descriptors, where each descriptor represents, e.g., a 5.12 microsecond time slot, to cover a maximum scheduling time of 333 milliseconds into the future. Specifically, each list 520a contains a plurality of entries 530a of queue descriptors including a queue index (Q) that references a class queue 310a-c-314a-c of queuing logic 300, a media link interface (I) that references a media link coupled to the router, and a priority value (P) indicating a priority level (e.g., high/low or CIR/EIR) assigned to a queue. The descriptors of a particular entry 530a may be substantially duplicated in the timing wheel, with the exception of different priority levels. For example, entries 532a and 534a represent the same queue entry having substantially the same descriptors with the exception of different priorities P-0 and P-1.

Queues are inserted onto the timing wheel with the cost of three memory access operations (e.g., read and write operations of the time slot "bucket" and a write operation of a pointer in the queue):

queue[priority].nextptr=wheel[slot];

wheel[slot]=$Q\_TO\_TW\_DESC$(queue,priority)

A timing wheel service routine requires two memory access operations of overhead to remove the list of eligible queues from a current time slot, and then requires one memory access operation per queue to "walk the list" while servicing the wheel. For a 20 Mpps router, an average of four (4) timing wheel memory access operations are needed per packet since the overhead of reading and clearing a time slot bucket is amortized by an average of 100 scheduling events (5 microsecond-per-slot/50 nanoseconds-per-packet).

Figure 5B:
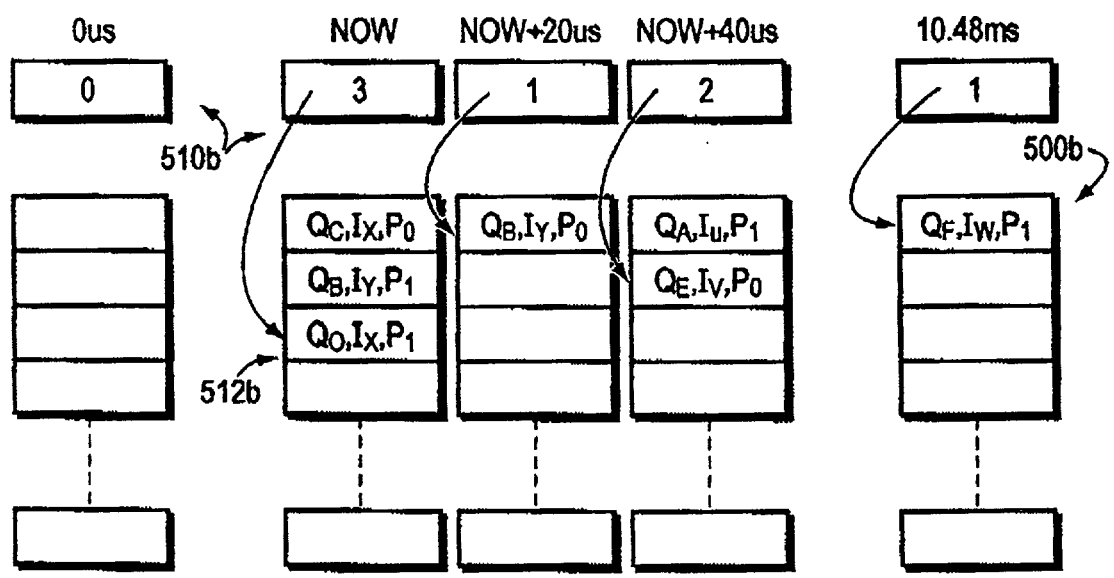

FIG. 5B is a schematic diagram of a timing wheel 500b organized as a plurality of per-time-slot queues organized as a descriptor ring (rather than a linked list) to thereby reduce the number of external access operations required to schedule or service a wheel slot. The descriptor ring comprises an array 510b of time slots, wherein each slot contains a queue-depth index that references a "tail" of a list of descriptors 512b. In the illustrative embodiment, there are preferably a fixed number of queue slots that hash to each time slot. To insert an entry onto the tail of a list, only three (3) memory accesses are required. Because it is not practical to have as many time slots as the linked list implementation, it may be desirable to have a number of wheel granularity types in order to accommodate different queue bandwidths.

According to the invention, the VTMS scheduler 400 implements a novel scheduling process/algorithm that provides class-based queuing (CBQ) behavior at a single "flattened" level of hierarchy. To that end, the VTMS algorithm calculates actual rates assigned to the queues and services them according to their assigned rates. The algorithm further functions to analyze the total available bandwidth within a time quantum of one packet so that it can "shape" each queue as desired. The net rates of all queues are equal to the shaped bandwidth at the output link. In essence, the VTMS algorithm eliminates the queuing function associated with intermediate level queues of conventional CBQ systems, while retaining the semantics configured for that level of queues.

Figure 6A:
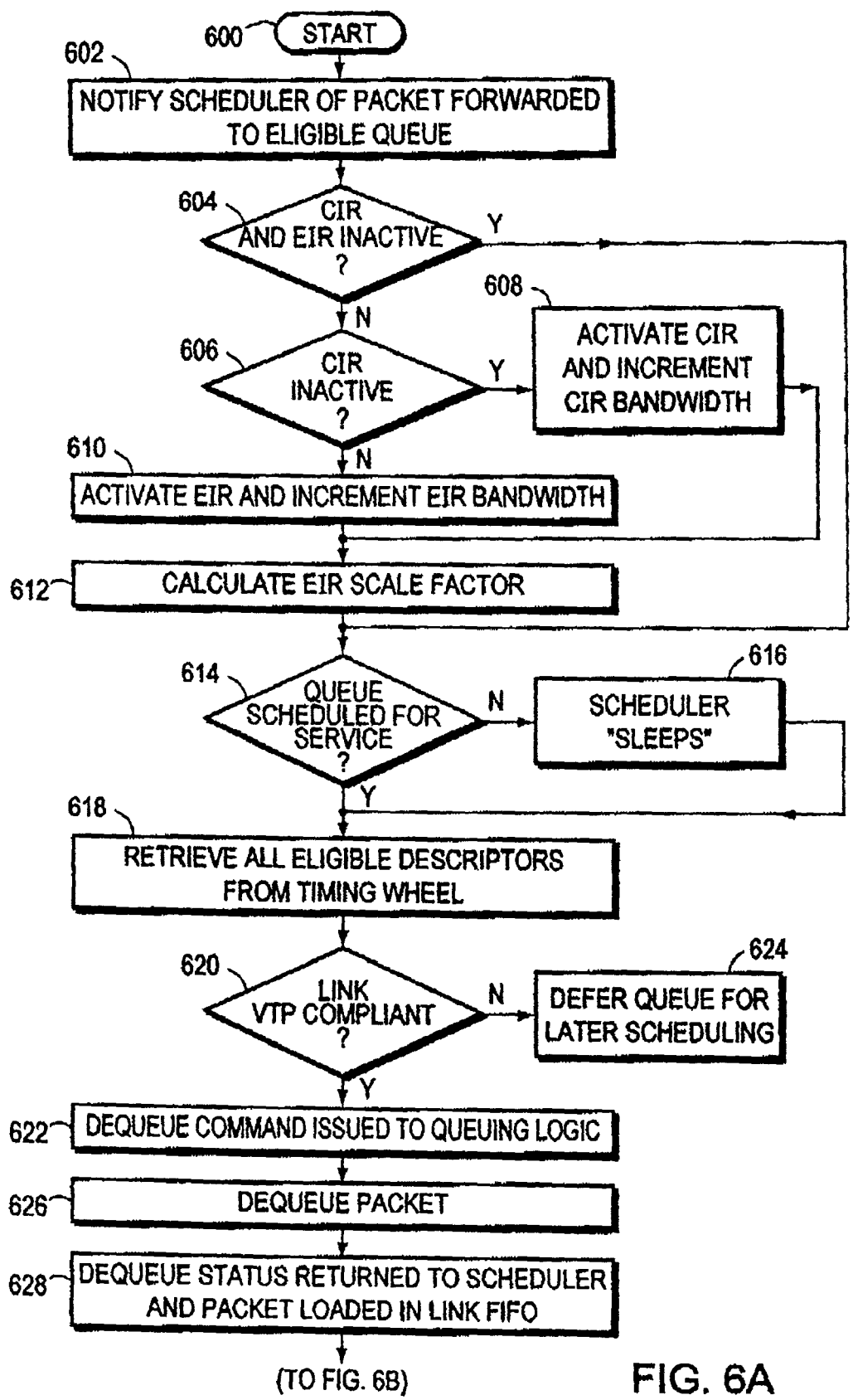
FIGS. 6A and 6B are flow charts illustrating a novel queue scheduling process according to the present invention.
Figure 6B:
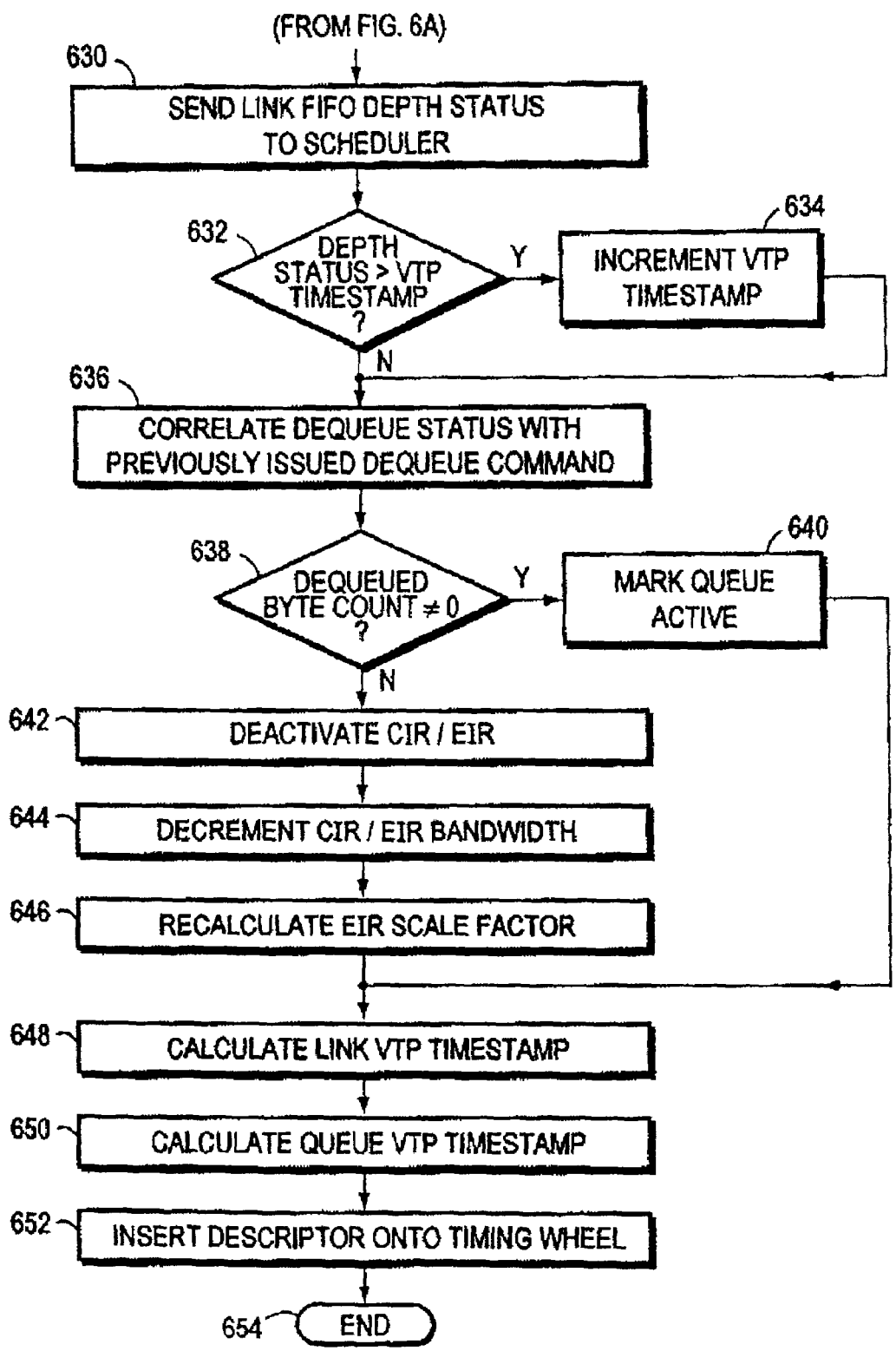

FIGS. 6A and 6B are flow charts illustrating the novel VTMS queue scheduling algorithm/process implemented by the VTMS queue scheduler 400. The process starts at Step 600 and proceeds to Step 602 where a notification is sent to the VTMS scheduler 400 for each packet forwarded to an eligible queue 310 of the queuing subsystem 300. In Step 604, the VTMS scheduler determines if the queue is active (i.e., already scheduled for servicing at a future time quantum by, e.g., checking a bit map) for both CIR and EIR rate components. If it is, no further work is required for this queue in this time quantum and the process jumps to Step 614.

Otherwise, the process proceeds to Step 606 where it is determined whether the queue is inactive for its CIR rate component. If so, the CIR rate is activated by, e.g., asserting an associated active bit, and the aggregate CIR bandwidth for the link is incremented by the queue's CIR configuration (Step 608). If the CIR component is not inactive, then the EIR rate is activated by, e.g., asserting its active bit, and the aggregate EIR bandwidth for the link is incremented by the queue's EIR configuration (Step 610). In Step 612, the EIR scale factor of the link is then calculated; an example of an equation used to calculate the EIR scale factor for a single-level hierarchy is:

scale=(aggregate link $EIR$)/(total link $BW$–aggregate link $CIR$)

The scale factor is used to proportionally scale the actual bandwidth used by the EIR components of all queues sharing the link so that the sum of all EIR bandwidths is equal to the available bandwidth of the link. In Step 614, the queue is scheduled onto the timing wheel 500 in the next available time quantum so that it may be serviced with minimal additional latency. It should be noted that a software optimization of the VTMS scheduling process involves skipping Steps 614-618 and proceeding directly to Step 620.

Specifically, the VTMS scheduler determines (at Step 614) whether any queue (descriptors) is scheduled for servicing. If not, the scheduler "sleeps" until a queue is scheduled for the current time or until the clock advances to a time slot with a scheduled queue (Step 616). Otherwise in Step 618, the scheduler retrieves all descriptors (one at a time) from the timing wheel that are scheduled for servicing at or before the current real time clock. Specifically, the queue index, rate component (CIR vs. EIR, aka priority value P) and link index I are extracted from each eligible descriptor.

At Step 620, the VTP timestamp of the output link FIFO 330 is compared with the current real time and the configurable burst value for this priority to determine whether the link VTP is compliant. This comparison operation is provided to ensure that collisions in time between the eligible queue and other queues do not cause the link FIFO 330 to exceed a configurable limit, which could result in subsequent latency to real time traffic. If the link VTP is compliant, the scheduler issues a dequeue command to the queuing logic 300 in Step 622.

Otherwise if the link VTP is non-compliant, a heuristic is applied to defer the queue for later scheduling when the link FIFO 330 is likely to be at a lower threshold (Step 624). A goal of the heuristic is to dynamically adjust for time drift due to rounding error, misconfiguration of link bandwidth and variations in bandwidth due to bit stuffing or controller overhead. A deferred queue does not have its VTP timestamp reset to a future value, so it has a chance to catch up to its configured bandwidth in the future; however, there is a burst threshold to prevent savings from carrying forward indefinitely. Note that an optimization exists to avoid deferral through the use of two strict priority queues between the primary queuing subsystem and the actual link interface. Threshold feedback status is needed to prevent the low priority (non-delay sensitive traffic) queue from overflowing.

At Step 626, the queuing logic 300 accepts the dequeue command from the scheduler 400 and dequeues a packet (or a block of small packets in some high-performance systems) from the specified queue. At Step 628, the length of the dequeued packet (or zero if the queue is empty) is returned as dequeue status to the scheduler and, if the queue length is non-zero, the dequeued packet is sent to the media controller 230 where it is loaded into the link FIFO 330. Status on the link FIFO depth threshold is periodically sent to the scheduler 400 in Step 630. If the FIFO depth threshold status indicates that there are more bits in the link FIFO than the link VTP timestamp represents (Step 632), then the scheduler increments the timestamp to account for the discrepancy in Step 634.

At Step 636, the scheduler correlates the dequeue status with information related to the previously issued dequeue command. If the dequeued byte count is non-zero (Step 638), the queue is marked as active at Step 640 and, as such, is eligible for servicing as soon as the byte count is non-zero. If the byte count is zero (the queue is empty), the CIR/EIR component of the queue is deactivated in Step 642 by, e.g., clearing the associated active bits. Upon transitioning to this empty state, the CIR or EIR aggregate bandwidth of the link is decremented at Step 644 and the EIR scale factor for the link is recalculated at Step 646. It should be noted that the VTMS scheduler reaches the empty state after the queue becomes empty and is re-scheduled, and is still empty. This serves to delay the recalculation of the EIR scale factor until the queue's virtual bandwidth portion has been fully used.

At Step 648, the link VTP timestamp is (re)calculated as follows:

if (ink.timestamp<now) link.timestamp=now;

link.timestamp+=bytes*link.inverse_shape_*bw*

At Step 650, the queue VTP timestamp is (re)calculated as follows:

if ((queue[priority].timestamp+queue[priority].burst) <now) queue[priority].timestamp=now;

queue[priority].timestamp+=bytes*queue[priority] .inverse_shape_*bw*

At Step 652, the queue descriptor is inserted back onto the timing wheel in the quantum corresponding to either (i) the queue VTP timestamp, (ii) the next time slot or (iii) further in time as determined by the deferral heuristic. The VTMS queue scheduling process then ends at Step 654.

Advantageously, the VTMS scheduler supports common queuing and queue service disciplines within a single framework that is sufficiently simple and compact for implementation in a hardware (ASIC) forwarding engine. The performance of the scheduler is independent of the number of queues and, thus, supports an arbitrary number of different queues and services, limited only by memory available in the intermediate station.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system for integrating traffic shaping and link sharing functions to enable scaling of a plurality of queues multiplexed to media links of an intermediate station in a computer network, the queues storing data packets that are destined for the media links, the system comprising:
   queuing logic configured to organize the queues into class queues of a plurality of queue sets, each queue set coupled to inputs of a sublink multiplexer having an output coupled to a media link via a media link queue;
   a queue scheduler configured to assign each class queue committed information bit rate (CIR) and excess information bit rate (EIR) bandwidths, and the media link a shaped maximum bit rate; and
   the queue scheduler further including a timing wheel organized as a descriptor ring with time slots, wherein each time slot includes a queue-depth index that references a tail of a list of queue descriptors associated with that time slot, each queue descriptor of the list of queue descriptors to indicate that a particular class queue is eligible for servicing.

2. The system of claim 1 wherein the queue scheduler comprises a EIR scaler that uniformly scales the EIR bandwidths of all queues sharing a media link so that the sum of all scaled EIR bandwidths equals an available bandwidth of the shaped media link.

3. The system of claim 2 wherein the queue scheduler further comprises a virtual time policer (VTP) configured to determine whether the media links are compliant and to calculate when a queue is next eligible for servicing.

4. The system of claim 1 wherein the queue descriptors include a queue index that references a class queue of the queuing logic.

5. The system of claim 1 wherein the queue descriptors include a media link interface that references a media link coupled to the intermediate station.

6. The system of claim 1 wherein the queue descriptors include a priority value indicating a priority level assigned to a queue.

7. A system for integrating traffic shaping and link sharing in a network device, the system comprising:
   queuing logic configured organize a plurality of class queues into a plurality of queue sets, each class queue associated with a particular type of data and, each queue set coupled to a particular media link of a plurality of media links; and
   a queue scheduler configured to assign each class queue a committed information bit rate (CIR) and a excess information bit rate (EIR) bandwidth, the EIR bandwidth scaled so that the sum of all scaled EIR bandwidths of all the class queues of a queue set does not exceed an available bandwidth of the shaped media link coupled to the queue set, the queue scheduler further including a timing wheel organized as a descriptor ring with time slots, wherein each time slot includes a queue-depth index that references a tail of a list of queue descriptors associated with that time slot, each queue descriptor of the list of queue descriptors to indicate that a particular class queue is eligible for servicing.

8. The system of claim 7 wherein each queue descriptor comprises a queue index that specifies the class queue eligible for servicing.

9. The system of claim 7 wherein each queue descriptor comprises a media link interface that specifies the media link coupled to queue set that includes the class queue eligible for servicing.

10. The system of claim 7 wherein each queue descriptor comprises a priority value that specifies a priority level assigned to the class queue eligible for servicing.

11. The system of claim 7 further comprising:
a virtual time policer (VTP) configured to determine whether utilization of buffers associated with the media links exceed configurable limits and to calculate when each class queue is next eligible for servicing.

12. A method for integrating traffic shaping and link sharing in a network device, the method comprising:
organizing a plurality of class queues into a plurality of queue sets, each class queue associated with a particular type of data and, each queue set coupled to a particular media link of a plurality of media links;
assigning each class queue a committed information bit rate (CIR) and a excess information bit rate (EIR) bandwidth;
scaling each EIR bandwidth so that the sum of all scaled EIR bandwidths of all the class queues of a queue set does not exceed an available bandwidth of the shaped media link coupled to the queue set; and
indicating when class queues are eligible for servicing with a timing wheel organized as a descriptor ring with time slots, each time slot including a queue-depth index that references a tail of a list of queue descriptors associated with that time slot, each queue descriptor of the list of queue descriptors indicating that a particular class queue is eligible for servicing.

13. The method of claim 12 wherein each queue descriptor indicates the class queue eligible for servicing.

14. The method of claim 12 wherein each queue descriptor indicates the media link coupled to queue set that includes the class queue eligible for servicing.

15. The method of claim 12 wherein each queue descriptor indicates a priority level assigned to the class queue eligible for servicing.

16. The method of claim 12 further comprising:
determining whether utilization of buffers associated with the media links exceed configurable limits; and
calculating when class queues are next eligible for servicing.

17. A system for integrating traffic shaping and link sharing in a network device, the system comprising:
means for organizing a plurality of class queues into a plurality of queue sets, each class queue associated with a particular type of data and, each queue set coupled to a particular media link of a plurality of media links;
means for assigning each class queue a committed information bit rate (CIR) and a excess information bit rate (EIR) bandwidth;
means for scaling each EIR bandwidth so that the sum of all scaled EIR bandwidths of all the class queues of a queue set does not exceed an available bandwidth of the shaped media link coupled to the queue set; and
means for indicating when class queues are eligible for servicing with a timing wheel organized as a descriptor ring with time slots, each time slot including a queue-depth index that references a tail of a list of queue descriptors associated with that time slot, each queue descriptor of the list of queue descriptors indicating that a particular class queue is eligible for servicing.

* * * * *